US008561753B2

(12) United States Patent
Ishige et al.

(10) Patent No.: US 8,561,753 B2
(45) Date of Patent: Oct. 22, 2013

(54) ELECTRIC POWER STEERING DEVICE

(76) Inventors: Shingo Ishige, Tochigi (JP); Yukio Tajima, Tochigi (JP); Masanobu Miyazaki, Tochigi (JP)

( * ) Notice: Subject to any disclaimer, the term of this patent is extended or adjusted under 35 U.S.C. 154(b) by 0 days.

(21) Appl. No.: 13/048,632

(22) Filed: Mar. 15, 2011

(65) Prior Publication Data

US 2012/0043156 A1 Feb. 23, 2012

(30) Foreign Application Priority Data

Aug. 20, 2010 (JP) ................................ 2010-184952

(51) Int. Cl.
*B62D 5/04* (2006.01)

(52) U.S. Cl.
USPC .......................................... 180/444; 180/443

(58) Field of Classification Search
USPC ......................................... 180/443, 444, 446
See application file for complete search history.

(56) References Cited

U.S. PATENT DOCUMENTS 6,364,049 B1 4/2002 Iwasaki et al.
2006/0191739 A1* 8/2006 Koga ............................ 180/446
2006/0213717 A1* 9/2006 Chikaraishi et al. .......... 180/444
2008/0035413 A1* 2/2008 Segawa et al. ................ 180/444
2011/0011666 A1* 1/2011 Hori et al. ..................... 180/444

FOREIGN PATENT DOCUMENTS

EP 1845009 A1 10/2007
GB 2402916 A 12/2004
JP 11-59441 3/1993
JP 2009-51354 3/2009
WO 2007/037499 A1 5/2007

* cited by examiner

*Primary Examiner* — Kevin Hurley
*Assistant Examiner* — Marc A Scharich
(74) *Attorney, Agent, or Firm* — Keith H. Orum

(57) ABSTRACT

An electric power steering device including an input shaft to which a steering wheel is connected, an output shaft connected to a wheel side, a torsion bar provided between the input shaft and the output shaft, and a torque sensor that detects steering torque input from the steering wheel. An electric motor is driven in accordance with the torque detected by the torque sensor. A worm wheel is provided on the output shaft to transmit rotation of the electric motor to the output shaft in a housing, wherein a boss of the worm wheel is fitted into an outer circumference of the output shaft, and a bearing fitted into the outer circumference of the boss is supported on the housing.

5 Claims, 3 Drawing Sheets

10
11
25
12
24
31
80
30
26
15
20
21
23
22
70
50
60
14
13A
40
27
90
13

20
21
22
23
22A
13A
13
65
66
14
12
15
14C
14B
61A
61
15B
14A
26
62
90
28
27
30
32
21A
82
80
31
21B
81
60
63
64
70
50

ELECTRIC POWER STEERING DEVICE

BACKGROUND OF THE INVENTION

1. Field of the Invention

The present invention relates to an electric power steering device.

2. Description of the Related Art

Japanese Patent Application Laid-Open (JP-A) No. 2009-51354 describes, as an electric power steering device, a device constructed by providing an input shaft to which a steering wheel is connected, an output shaft connected to a wheel side, a torsion bar provided between the input shaft and the output shaft, a torque sensor that detects steering torque input from the steering wheel, an electric motor driven in accordance with the torque detected by the torque sensor, and a worm wheel provided on the output shaft to transmit rotation of the electric motor to the output shaft in a housing.

In an electric power steering device described in JP-A No. 2009-51354, a supporting structure for the housing of the output shaft for which the worm wheel is provided is as follows.

A boss of the worm wheel is fitted into an outer circumference of the output shaft and bearings are fitted into two positions on both sides sandwiching the boss of the worm wheel on the output shaft to support these two bearings on the housing.

Therefore, the boss of the worm wheel and the two bearings are aligned in a row in an axial direction of the output shaft and there is a large space to support the output shaft inside the housing.

As a positioning structure of the bearing on the output shaft, a ring protrusion provided on the outer circumference of the output shaft or a special positioning structure such as a nut screwed into the outer circumference of the output shaft is used. This also increases the required support space of the output shaft inside the housing.

SUMMARY OF THE INVENTION

An object of the present invention is to make a supporting structure more compact with respect to a housing of an output shaft in an electric power steering device by providing a worm wheel that transmits rotation of an electric motor to the output shaft.

Another object of the present invention is to support the output shaft for which the worm wheel is provided by only one bearing on the housing.

In a first embodiment of the invention, there is provided an electric power steering device constructed by providing an input shaft to which a steering wheel is connected, an output shaft connected to a wheel side, a torsion bar provided between the input shaft and the output shaft, a torque sensor that detects steering torque input from the steering wheel, an electric motor driven in accordance with the torque detected by the torque sensor, and a worm wheel provided on the output shaft to transmit rotation of the electric motor to the output shaft in a housing. A boss of the worm wheel is fitted into an outer circumference of the output shaft and a bearing fitted into the outer circumference of the boss is supported on the housing.

In a second embodiment of the invention, there is provided the electric power steering device according to the first embodiment, wherein at least a portion of the outer circumference into which the bearing of the boss is fitted in an axial direction of the worm wheel is arranged within a range of tooth width of teeth of the worm wheel.

In a third embodiment of the invention, there is provided the electric power steering device according to the first or second embodiment, wherein the bearing is held between a raised surface from the boss of the worm wheel fitted into the outer circumference of the output shaft and an end face of a wheel-side connection member attached to the outer circumference of the output shaft in the axial direction to fix the bearing.

In a fourth embodiment of the invention, there is provided the electric power steering device according to any of the first to third embodiments, wherein the boss of the worm wheel fitted into the outer circumference of the output shaft is positioned by being press-fitted into the output shaft or by being locked to a retaining ring provided on one side of the output shaft.

In a fifth embodiment of the invention, there is provided the electric power steering device according to any of the first to third embodiments, wherein the wheel-side connection member attached to the outer circumference of the output shaft is positioned by being press-fitted into the output shaft or by being locked to a retaining ring provided on another side of the output shaft.

In a sixth embodiment of the invention, there is provided the electric power steering device according to any of the first to fifth embodiments, wherein the housing is formed by a second housing being fitted into a first housing on the steering wheel side. The output shaft has a major diameter portion into which the wheel-side connection member is fitted, a median diameter portion into which the boss of the worm wheel is fitted, and a minor diameter portion inserted into a hole of the input shaft. The boss of the worm wheel is fitted into the outer circumference of the median diameter portion and the bearing fitted into the outer circumference of the boss is attached to an inner circumference of a center cylinder of the second housing by insertion, to support the output shaft. In a seventh embodiment of the invention, there is provided the electric power steering device according to the sixth embodiment, wherein the torque sensor is arranged around the input shaft and the output shaft inside the first housing. The electric motor is mounted on an outer surface of the first housing and is driven in accordance with torque detected by the torque sensor.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
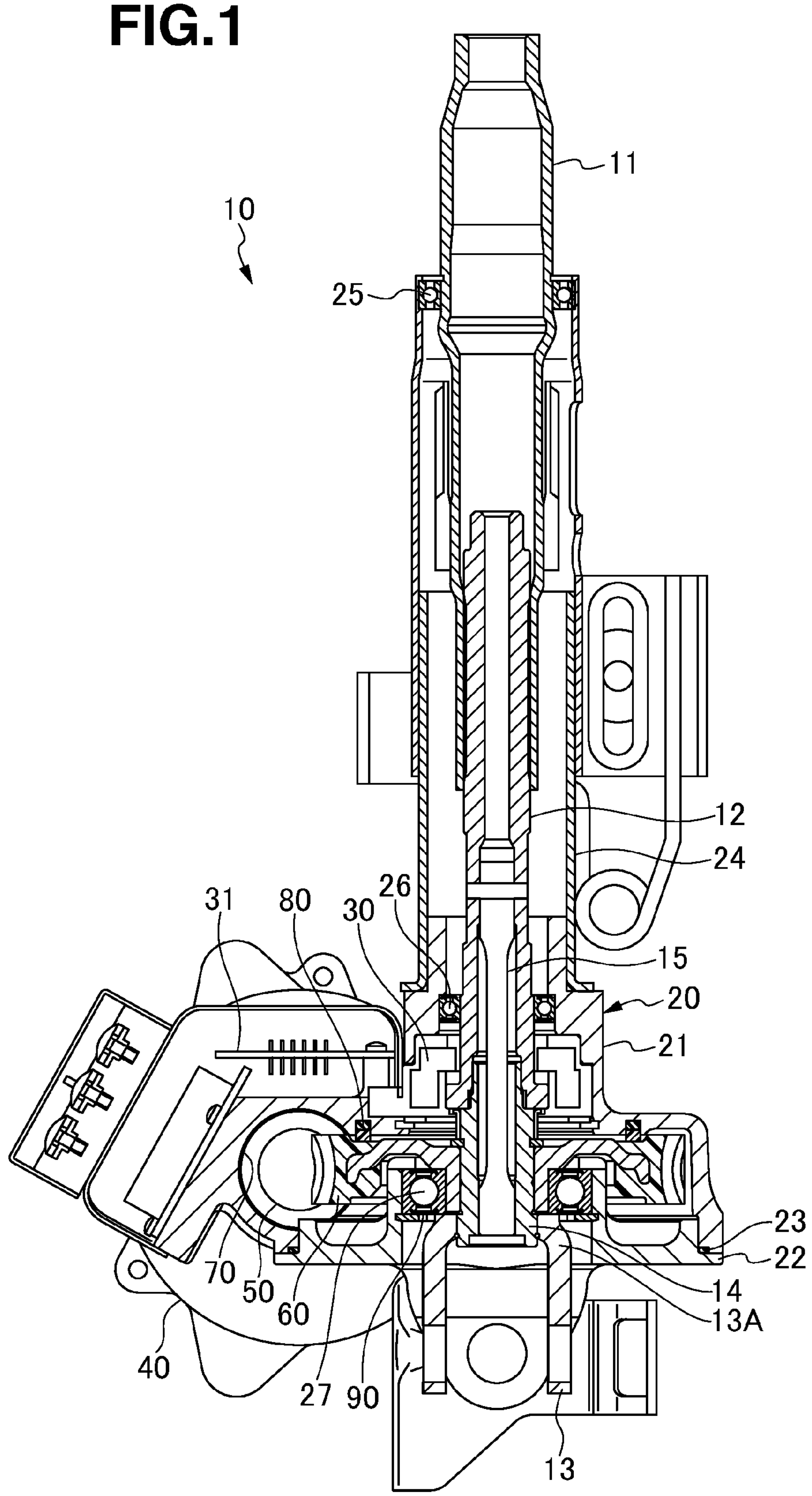
FIG. 1 is a sectional view showing an entire electric power steering device.
Figure 2:
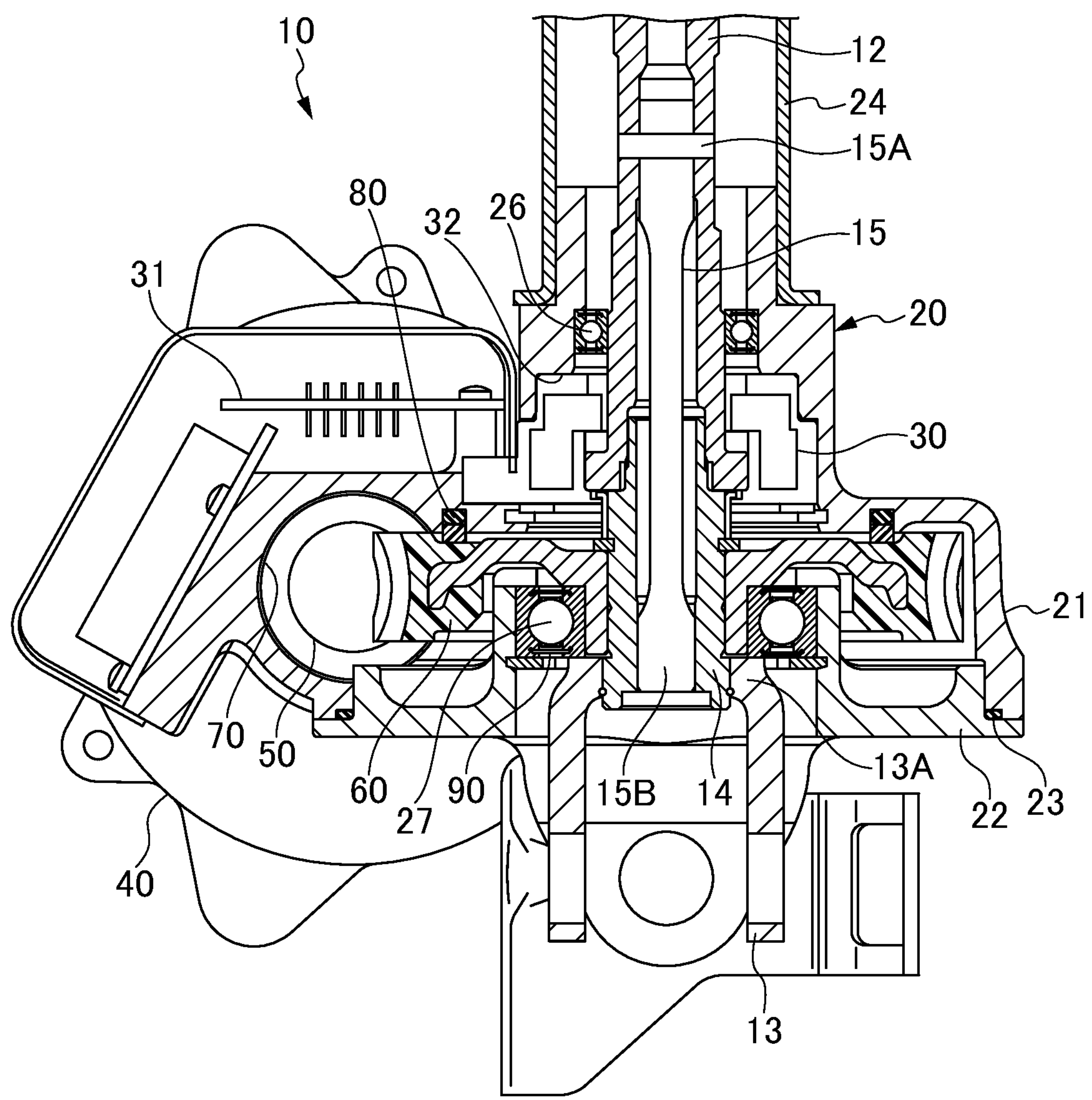
FIG. 2 is a sectional view showing a portion of FIG. 1.

As shown in FIGS. 1 and 2, an electric power steering device 10 has a steering wheel (not shown) linked to an upper shaft 11 and an input shaft 12 is serration-coupled to the upper shaft 11. An output shaft 14 is connected to a steering gear (not shown) on the wheel side via a wheel-side connection member 13 such as a yoke of a universal joint. That is, the electric power steering device 10 has the input shaft 12 connected to a steering wheel, the output shaft 14 connected to the wheel side, and a torsion bar 15 provided between the input shaft 12 and the output shaft 14. The electric power steering device 10 transmits steering torque applied to the steering wheel by a driver of the vehicle to the wheel via the input shaft 12, the torsion bar 15, the output shaft 14, the wheel-side connection member 13, and a steering gear in such a way that a rudder angle of the steering torque changes. The steering gear may be, for example, a rack-and-pinion steering gear that transmits a displacement of a rack that engages with a pinion being rotated by steering torque to the wheel via a tie rod, steering arm or the like.

The electric power steering device 10 contains the input shaft 12, the output shaft 14, and the torsion bar 15 in a housing 20. The housing 20 is constructed by fitting a second housing 22 fluid tight to a first housing 21 on the side of the steering wheel via an O-ring 23 and linking the housings 21 and 22 by bolts (not shown). A tubular column 24 is mounted on the first housing 21 by press fitting. The upper shaft 11 is pivotally supported on the column 24 by a bearing 25 such as a ball bearing. The input shaft 12 is pivotally supported on the first housing 21 by a bearing 26 such as a ball bearing, and the output shaft 14 is pivotally supported on the second housing 22 by a bearing 27 such as a ball bearing, as described below.

The torsion bar 15 consisting of an elastic rod is inserted into a center hole concentric to the input shaft 12 and the output shaft 14. One end of the torsion bar 15 is linked to the input shaft 12 by a pin 15A, and the other end of the torsion bar 15, an engagement portion 15B is engaged with the output shaft 14. The input shaft 12 and the output shaft 14 elastically rotate relatively around the center axis in accordance with steering torque.

The electric power steering device 10 has a torque sensor 30, an electric motor 40, a worm gear 50, and a worm wheel 60 provided in the housing 20 (21, 22).

The torque sensor 30 is arranged around the input shaft 12 and the output shaft 14 inside the first housing 21. The torque sensor 30 detects steering torque based on a relative displacement in the rotation direction caused between the input shaft 12 and the output shaft 14 as a result of elastic torsional deformation by steering torque input from the steering wheel to the input shaft 12. A detection circuit board 31 constituting a portion of the torque sensor 30 is mounted on an outer surface of the first housing 21.

The electric motor 40 is mounted on the outer surface of the first housing 21 and is driven in accordance with torque detected by the torque sensor 30. The worm gear 50 mounted on the rotation axis of the electric motor 40 and the worm wheel 60 mounted on an outer circumference of the output shaft 14, as described below, are arranged inside the housing 20 (21, 22) to engage with each other. Accordingly, a steering assisting force caused by rotation of the electric motor 40 driven in accordance with the torque detected by the torque sensor 30 is transmitted to the output shaft 14 after being decelerated by engagement between the worm gear 50 and the worm wheel 60. The steering assisting force transmitted to the output shaft 14 is transmitted to the wheel via the wheel-side connection member 13 and the steering gear.

In the electric power steering device 10, teeth 64 of the worm wheel 60 are arranged so as to be accommodated in a lubrication chamber 70 partitioned in the housing 20 (21, 22) together with teeth of the worm gear 50. Grease is applied to the teeth 64 of the worm wheel 60 inside the lubrication chamber 70.

Figure 3:
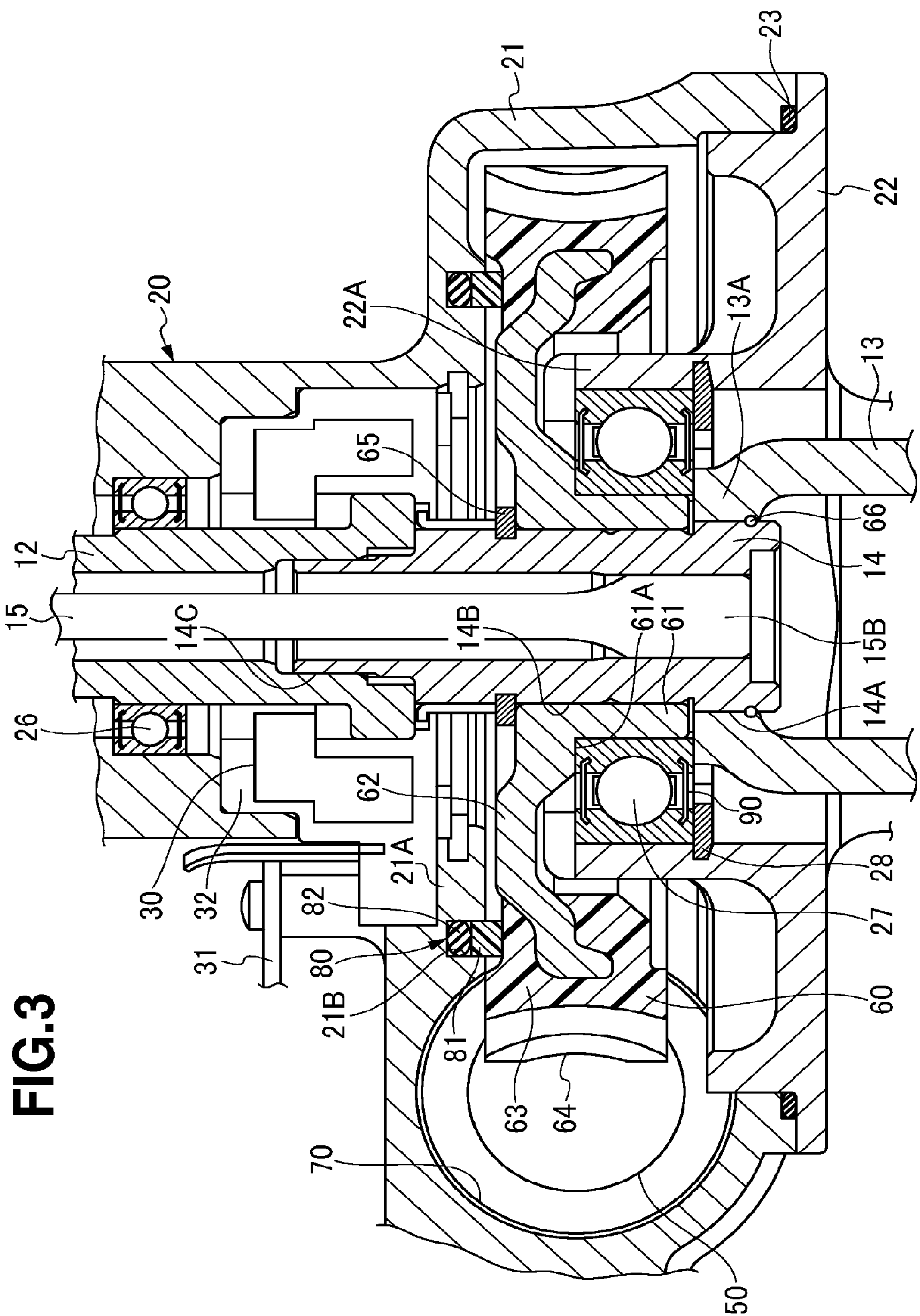
FIG. 3 is an enlarged sectional view of principal parts of FIG. 2.

As shown in FIG. 3, the worm wheel 60 has a boss 61 fitted into the outer circumference of the output shaft 14, a disk 62 extending to the outside from the boss 61 (or a plurality of arms extending radially from the boss 61), and a rim 63 provided in an outer edge of the disk 62 and includes the teeth 64 on the outer circumference of the rim 63. The boss 61 and the disk 62 are formed of a cored bar to ensure strength of the boss 61 and the disk 62 and the rim 63 including the teeth 64 is formed of resin to make engagement sound with the worm gear 50 quieter.

Regarding the electric power steering device 10, (A) Supporting structure of the output shaft 14 and the worm wheel 60 and (B) Sealing structure of the lubrication chamber 70 will be described below in detail.

(A) Supporting Structure of the Output Shaft 14 and the Worm Wheel 60 (FIG. 3)

The outer circumference of the output shaft 14 is divided into a major diameter portion 14A into which a yoke ring portion 13A of the wheel-side connection member 13 is fitted, a median diameter portion 14B into which the boss 61 of the worm wheel 60 is fitted, and a minor diameter portion 14C inserted into the hole of the input shaft 12.

Then, the boss 61 of the worm wheel 60 is fitted into the outer circumference of the median diameter portion 14B of the output shaft 14 and the bearing 27 fitted into the outer circumference of the boss 61 is attached to an inner circumference of a center cylinder 22A of the second housing 22 by insertion to support the output shaft 14 and the worm wheel 60.

At least a portion of the outer circumference into which the bearing 27 of the boss 61 is fitted in the axial direction of the worm wheel 60 (an end face near the yoke ring portion 13A of the boss 61 to a raised surface 61A where the disk 62 of the boss 61 rises) is arranged within a range of tooth width of the teeth 64 of the worm wheel 60. In the present embodiment, the raised surface 61A matches the center line of the teeth 64.

The bearing 27 is positioned as follows.

(1) An inner ring of the bearing 27 is held between the raised surface 61A from the boss 61 of the worm wheel 60 fitted into the outer circumference of the output shaft 14 and the end face of the yoke ring portion 13A of the wheel-side connection member 13 attached to the outer circumference of the output shaft 14 in the axial direction to fix the bearing 27.

An outer ring of the bearing 27 is locked to a retaining ring 28 attached to the inner circumference of the center cylinder 22A of the second housing 22 on the side of the yoke ring portion 13A of the wheel-side connection member 13.

(2) The boss 61 of the worm wheel 60 fitted into the outer circumference of the output shaft 14 is positioned by being press-fitted into the median diameter portion 14B of the output shaft 14 or by being locked to a retaining ring 65 provided in the median diameter portion 14B of the output shaft 14. By crimping the retaining ring 65, the boss 61 of the worm wheel 60 can be fixed without a gap to the end face of the yoke ring portion 13A of the wheel-side connection member 13.

(3) The yoke ring portion 13A of the wheel-side connection member 13 attached to the outer circumference of the output shaft 14 is positioned by being press-fitted into the major diameter portion 14A of the output shaft 14 or by being locked to a retaining ring 66 provided in the major diameter portion 14A of the output shaft 14.

According to the present embodiment, the following operation/working-effects can be achieved.

(a) The boss 61 of the worm wheel 60 is fitted into the outer circumference of the output shaft 14 and the bearing 27 fitted into the outer circumference of the boss 61 is supported by the housing 20 (22). Therefore, the boss 61 of the worm wheel 60 and the bearing 27 are arranged in a piled up manner in the radial direction of the output shaft 14 so that the space in the axial direction to support the output shaft 14 inside the housing 20 (22) can be made smaller.

(b) At least a portion of the outer circumference into which the bearing 27 of the boss 61 is fitted in the axial direction of the worm wheel 60 is arranged within the range of tooth width of the teeth 64 of the worm wheel 60. Accordingly, the center of the teeth 64 of the worm wheel 60 on the output shaft 14 and the center of the bearing 27 can be matched or arranged nearby in the axial direction of the output shaft 14. The engagement load acting on the worm wheel 60 can be supported with stability by the bearing 27 alone fitted into the boss 61 of the worm wheel 60. The output shaft 14 provided with the worm wheel 60 can be supported with stability by the only one bearing 27 on the housing 20 (22).

(c) The bearing 27 is held between the raised surface 61A from the boss 61 of the worm wheel 60 fitted into the outer circumference of the output shaft 14 and the end face of the wheel-side connection member 13 attached to the outer circumference of the output shaft 14 in the axial direction to fix the bearing 27. By using the worm wheel 60 itself and the wheel-side connection member 13 as a positioning structure of the bearing 27 on the output shaft 14, a positioning special structure such as a ring protrusion and nuts does not have to be added to the outer circumference of the output shaft 14. Accordingly, the support space of the output shaft 14 inside the housing 20 (22) can also be made smaller.

(d) The boss 61 of the worm wheel 60 is positioned by being press-fitted into the output shaft 14 or by being locked to the retaining ring 65 provided on one side of the output shaft 14.

(e) The wheel-side connection member 13 is positioned by being press-fitted into the output shaft 14 or by being locked to the retaining ring 66 provided on another side of the output shaft 14. (B) Sealing structure of the lubrication chamber 70 (FIG. 3)

First and second sealing means 80 and 90 to seal a lubricant (for example, grease) inside the lubrication chamber 70 are provided on both sides of the teeth 64 of the worm wheel 60.

The first sealing means 80 is provided on one side (the side of a torque sensor chamber 32 inside the housing 20 (21) where the torque sensor 30 is provided) of the teeth 64 of the worm wheel 60. The first sealing means 80 consists of a seal ring 81 which is fixed to one of a wall surface of a partition wall 21A dividing into the lubrication chamber 70 and the torque sensor chamber 32 of the first housing 21, and the side face of the resin rim 63 (the disk 62 may also be allowed) of the worm wheel 60, and which slidingly comes into contact with the other. In the present embodiment, a backup O-ring 82 is loaded on a groove bottom side of a ring groove 21B provided around the center axis of the output shaft 14 on the wall surface facing the worm wheel 60 of the partition wall 21A of the first housing 21, and the groove is loaded with the seal ring 81 made of such as Teflon (registered trademark) on the O-ring 82 inside the groove. With the O-ring 82, the seal ring 81 which is explosively pressurized outwards from the ring groove 21B slidingly comes into contact with the side face of the rim 63 of the worm wheel 60.

The output shaft 14 provided with the worm wheel 60 is supported by the only one bearing 27 on the housing 20 (22). The bearing 27 may be set as a sealed bearing provided on the other side of the teeth 64 of the worm wheel 60, and the sealed bearing 27 may be the second sealing means 90 provided on the other side of the teeth 64 of the worm wheel 60.

The bearing 27 is supported, as described above, by the center cylinder 22A of the second housing 22 while being fitted into the outer circumference of the boss 61 of the worm wheel 60 fitted into the outer circumference of the output shaft 14. Then, at least a portion of the outer circumference into which the bearing 27 of the boss 61 is fitted in the axial direction of the worm wheel 60 (the end face near the yoke ring portion 13A of the boss 61 to the raised surface 61A where the disk 62 of the boss 61 rises) is arranged within the range of tooth width of the teeth 64 of the worm wheel 60.

Incidentally, the output shaft 14 provided with the worm wheel 60 may be supported on the housing 20 (21, 22) by two bearings sandwiching the worm wheel 60 from both sides. For example, the above first sealing means 80 consisting of the seal ring 81 and a bearing without sealing are arranged on one side of the teeth 64 of the worm wheel 60. It is preferable to arrange the first sealing means 80 closer to the lubrication chamber 70 in the radial direction than the bearing without sealing so that the first sealing means 80 directly faces and is in contact with the lubrication chamber 70 without going through the bearing without sealing. In one example, the above second sealing means 90 consisting of the bearing 27 to be a sealed bearing is arranged on the other side of the teeth 64 of the worm wheel 60.

According to the present embodiment, the following operation/working-effects can be achieved:

(a) By adopting the seal ring 81 that is fixed to one of the wall surface of the housing 20 (21) and the side face of the worm wheel 60 and which slidingly comes into contact with the other as the first sealing means 80 provided at least one side of the teeth 64 of the worm wheel 60, the lubrication chamber 70 can easily be sealed. In addition to sealing a lubricant such as grease, in the lubrication chamber 70, poor lubrication of the worm wheel 60, swelling of resin components and an electric short-circuit after infiltration of a lubricant to the side of the torque sensor 30 can be avoided.

(b) If the seal ring 81 in (a) is provided to directly face and be in contact with the lubrication chamber 70 without going through another bearing, sealing properties of the seal ring 81 can be improved and the life of the seal ring 81 can easily be ensured by always lubricating a sliding portion of the seal ring 81 sufficiently and reliably with a lubricant.

(c) The output shaft 14 provided with the worm wheel 60 is supported by the only one bearing 27 on the housing 20 (22). The bearing 27 is set as the sealed bearing 27 provided on the other side of the teeth 64 of the worm wheel 60, and the sealed bearing 27 configures the second sealing means 90 provided on the other side of the teeth 64 of the worm wheel 60. The sealing means 80 provided on one side of the teeth 64 of the worm wheel 60 is easily configured by the seal ring 81 and while simplifying the bearing 27 supporting the output shaft 14 by using only one bearing, the bearing 27 as a sealed bearing is also used as the sealing means 90 provided on the other side of the teeth 64 of the worm wheel 60. The supporting structure of the output shaft 14 provided with the worm wheel 60 is thereby simplified. Also, the lubrication chamber 70 of the teeth 64 of the worm wheel 60 can easily be sealed.

(d) The bearing 27 in (c) is supported on the housing 20 (22) while being fitted into the outer circumference of the boss 61 of the worm wheel 60 fitted into the outer circumference of the output shaft 14, and at least a portion of the outer circumference into which the bearing 27 of the boss 61 is fitted in the axial direction of the worm wheel 60 is arranged within the range of tooth width of the teeth 64 of the worm wheel 60. Accordingly, the center of the teeth 64 of the worm wheel 60 on the output shaft 14 and the center of the bearing 27 can be matched or arranged nearby in the axial direction of the worm wheel 60. The engagement load acting on the worm wheel 60 can be supported only by the bearing 27 fitted into the boss 61 of the worm wheel with stability so that the output shaft 14 provided with the worm wheel 60 can be supported with stability by the only one bearing 27 on the housing 20 (22).

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

According to the present invention, in an electric power steering device, there is provided an input shaft to which a steering wheel is connected, an output shaft connected to a wheel side, a torsion bar provided between the input shaft and the output shaft, a torque sensor that detects steering torque input from the steering wheel, and an electric motor driven in accordance with the torque detected by the torque sensor. A worm wheel is provided on the output shaft to transmit rotation of the electric motor to the output shaft in a housing. A boss of the worm wheel is fitted into an outer circumference of the output shaft and a bearing fitted into the outer circumference of the boss is supported on the housing. Accordingly, the supporting structure for the housing of the output shaft can be made more compact in an electric power steering device constructed by providing the worm wheel that transmits rotation of the electric motor to the output shaft.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

The invention claimed is:

1. An electric power steering device comprising: a housing; an input shaft configured to be operably connected to a steering wheel; an output shaft connected to the power steering device a torsion bar provided between the input shaft and the output shaft; a torque sensor that detects steering torque input from the steering wheel; an electric motor driven in accordance with the steering torque detected by the torque sensor; a worm wheel provided within the housing and fitted around the output shaft to transmit rotation of the electric motor to the output shaft, the worm wheel including a boss fitted around an outer circumference of the output shaft and a bearing fitted around an outer circumference of the boss, the bearing being supported on the housing such that the bearing is held in an axial direction of the power steering device between a raised surface extending from the boss and an end face of a connection member attached to the outer circumference of the output shaft; and wherein at least a portion of the bearing fitted around the outer circumference of the boss is disposed within a space defined by the worm wheel in the axial direction such that teeth of the worm wheel at least partially surround the bearing in a radial direction of the worm wheel.

2. The electric power steering device according to claim 1, wherein the housing of the power steering device is formed by a second housing being fitted into a first housing;

the output shaft has a major diameter portion to which the connection member is fitted, a median diameter portion to which the boss of the worm wheel is fitted, and a minor diameter portion inserted into a hole of the input shaft; and wherein the boss of the worm wheel is fitted around an outer circumference of the median diameter portion, and the bearing fitted around the outer circumference of the boss is attached to an inner circumference of a center cylinder of the second housing to support the output shaft.

3. The electric power steering device according to claim 2, wherein the torque sensor is disposed around the input shaft and the output shaft inside the first housing; and the electric motor is mounted on an outer surface of the first housing and is driven in accordance with the steering torque detected by the torque sensor.

4. The electric power steering device according to claim 1, wherein the boss of the worm wheel is fitted around the outer circumference of the output shaft by being press-fitted to the output shaft or by being locked to a retaining ring provided on the output shaft.

5. The electric power steering device according to claim 1, wherein the connection member attached to the outer circumference of the output shaft is attached by being press-fitted to the output shaft or by being locked to a retaining ring provided on the output shaft.

* * * * *